(12) United States Patent
Schmidt et al.

(10) Patent No.: US 12,255,486 B2
(45) Date of Patent: Mar. 18, 2025

(54) CHARGING OF A BATTERY CELL

(71) Applicant: Bayerische Motoren Werke Aktiengesellschaft, Munich (DE)

(72) Inventors: Jan Philipp Schmidt, Holzmaden (DE); Johannes Wandt, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 529 days.

(21) Appl. No.: 17/640,153

(22) PCT Filed: Aug. 14, 2020

(86) PCT No.: PCT/EP2020/072837
§ 371 (c)(1),
(2) Date: Mar. 3, 2022

(87) PCT Pub. No.: WO2021/043563
PCT Pub. Date: Mar. 11, 2021

(65) Prior Publication Data
US 2022/0311262 A1 Sep. 29, 2022

(30) Foreign Application Priority Data
Sep. 4, 2019 (DE) .................... 10 2019 123 739.4

(51) Int. Cl.
*H02J 7/00* (2006.01)
*H01M 10/052* (2010.01)
(Continued)

(52) U.S. Cl.
CPC ..... *H02J 7/007182* (2020.01); *H01M 10/052* (2013.01); *H01M 10/44* (2013.01);
(Continued)

(58) Field of Classification Search
CPC .. H02J 7/007182; H02J 7/0047; H02J 7/0063; H02J 7/00711; H01M 10/052; H01M 10/44; H01M 10/441; B60L 53/62
(Continued)

(56) References Cited

U.S. PATENT DOCUMENTS 6,137,265 A 10/2000 Cummings et al.
2011/0037438 A1 2/2011 Bhardwaj et al.
(Continued)

FOREIGN PATENT DOCUMENTS

DE 39 38 045 A1 5/1990
DE 10 2016 103 420 A1 9/2016

OTHER PUBLICATIONS

International Search Report (PCT/ISA/210) issued in PCT Application No. PCT/EP2020/072837 dated Nov. 19, 2020 with English translation (four (4) pages).
(Continued)

*Primary Examiner* — Zixuan Zhou
(74) *Attorney, Agent, or Firm* — Crowell & Moring LLP

(57) ABSTRACT

A method for charging a battery cell is provided. During a charging phase at a constant charging current, monitoring is carried out to ascertain whether a charging voltage applied to the battery cell reaches or exceeds a predefined switchover voltage, and, if this is the case, a switchover is made to the next charging phase at a lower constant charging current. During the charging phases, additional monitoring is carried out to ascertain whether the difference between the charging voltage and the switchover voltage of this charging phase reaches or falls below a predefined value, and, if so, at least one discharge pulse is applied to the battery cell.

18 Claims, 3 Drawing Sheets

(51) Int. Cl.
  *H01M 10/44* (2006.01)
  *B60L 53/62* (2019.01)
(52) U.S. Cl.
  CPC ......... *H01M 10/441* (2013.01); *H02J 7/0047* (2013.01); *H02J 7/0063* (2013.01); *H02J 7/00711* (2020.01); *B60L 53/62* (2019.02)
(58) Field of Classification Search
  USPC .......................................................... 320/128
  See application file for complete search history.

(56) References Cited

U.S. PATENT DOCUMENTS

| | | | | |
|---|---|---|---|---|
| 2015/0340885 | A1* | 11/2015 | Baek | H02J 7/0013 320/160 |
| 2016/0178706 | A1* | 6/2016 | Liu | G01R 31/392 702/63 |
| 2016/0276843 | A1 | 9/2016 | Chang et al. | |
| 2017/0341520 | A1* | 11/2017 | Chang | B60L 58/24 |

OTHER PUBLICATIONS

Japanese-language Written Opinion (PCT/ISA/237) issued in PCT Application No. PCT/EP2020/072837 dated Nov. 19, 2020 (six (6) pages).
German-language Search Report issued in German Application No. 10 2019 123 739.4 dated Apr. 22, 2020 with partial English translation (nine (9) pages).
Korean-language Office Action issued in Korean Application No. 10-2022-7005301 dated Jul. 1, 2024 with English Translation (11 pages).

* cited by examiner

CHARGING OF A BATTERY CELL

BACKGROUND AND SUMMARY OF THE INVENTION

The invention relates to a method for charging a battery cell, in which, during a charging phase with a charging current that is at least approximately constant, monitoring is carried out to determine whether a charging voltage applied to the battery cell reaches or exceeds a predefined changeover voltage and, if this is the case, there is a changeover to a next charging phase with a charging current that is at least approximately constant, but lower. The invention also relates to a battery charging apparatus that is designed to carry out the method. The invention also relates to a vehicle that has at least part of the battery charging apparatus and/or to a charging station for a vehicle that has at least part of the battery charging apparatus. The invention is in particular advantageously applicable to the charging of vehicle batteries, specifically of vehicles driven by electric battery.

Fast charging is a very important factor for user acceptance of battery-electric vehicles. The objective here is to allow particularly short charging times without compromising the safety or service life of the store.

In the course of multistep constant current (MSCC) charging, an electric charging current is gradually reduced in a stepwise manner, with the result that an anode potential of the charged battery cell does not flow into a region in which metallic lithium is deposited on the electrodes of the battery cell (what is known as "plating"). This results in a characteristic step pattern for the charging current, which step pattern is, for example, disclosed in U.S. Pat. No. 6,137,265 A, FIG. 3B and is already used to charge present battery-electric vehicles.

In the case of MSCC, in spite of an overall anode potential, or an anode potential determined over the entire anode, that should not allow plating, plating may occur, since the electric currents and current densities on and in real electrodes are inhomogeneous, for example on account of the interaction of the transport processes with inhomogeneities in the electrode structure, a porous structure of the electrodes and a finite extent of the electrodes. The overall anode potential is therefore a mixed potential of different local anode potentials, wherein local anode potentials can assume values at which plating occurs even when this should not occur when considering only the overall anode potential. In order to counteract the plating under real conditions, the charging current can be reduced, which, however, disadvantageously causes the charging time to be increased.

The object of the present invention is to at least partially overcome the disadvantages of the prior art and in particular to provide multistep constant current charging that particularly reliably prevents plating, with only a slight increase in the charging time.

This object is achieved according to the claimed invention.

The object is achieved by a method for charging a battery cell, in which, during a charging phase with a charging current that is at least approximately constant, or with a charging current with a current intensity that is at least approximately constant, monitoring is carried out to determine whether a charging voltage applied to the battery cell reaches or exceeds a predefined changeover voltage and, if this is the case, there is a changeover to a next charging phase with a lower charging current that is at least approximately constant, or with a charging current with a lower current intensity that is likewise at least approximately constant, and during the charging phases, additional monitoring is carried out to determine whether a predefined difference between the charging voltage and the changeover voltage of this charging phase is reached or fallen below, and, if so, at least one discharge pulse is applied to the battery cell.

By injecting the at least one discharge pulse, this method achieves the effect of preventing depositions on an electrode of the battery cell, for example a deposition of metallic lithium on an anode of a lithium-ion battery cell, and even removing depositions, which may already be present, again. Since, additionally, the at least one discharge pulse is only injected or applied at a comparatively late point in time in the respective charging phase, at which the risk of plating is particularly high, the discharge pulses act particularly effectively. Only comparatively few and short discharge pulses are then needed, which in turn only slightly increases the charging time. In other words, the discharge pulses are not (e.g. cyclically) triggered at previously firmly predefined points in time, but rather depending on the situation, only when the risk of plating is particularly high. The predefined difference specifically corresponds to an anode voltage that has approached its zero value in the course of the charging phase to the extent that there is a noticeably increased risk of plating due to the inhomogeneities of the electrodes, in particular of the anode, for example because there could already be a negative anode potential present locally there, even though the overall anode potential is still positive.

The current intensity of a charging phase being "at least approximately" constant means in particular that in the course of a charging phase it does not deviate, in particular does not drop, by more than 10% from its initial value or initial target value. In one development, it is understood that the current intensity does not deviate, in particular does not drop, by more than 5%, in particular not more than 4%, in particular not more than 3%, in particular not more than 2%, in particular not more than 1%, from the initial current intensity.

In one development, a deviation of the current intensity from its initial value or initial target value during a charging phase is considerably smaller, in particular at least an order of magnitude smaller, than a value reduction of the initial values or initial target values of two successive charging phases. In one development, this deviation within a charging phase is not more than 10%, in particular not more than 5%, in particular not more than 4%, in particular not more than 3%, in particular not more than 2%, in particular not more than 1%, of a difference between the initial value or initial target value of this charging phase and the initial value or initial target value of the preceding charging phase and/or the following charging phase.

In one development, the charging power is kept constant during a charging phase. Since the charging voltage increases slightly during charging of a battery cell with constant charging current, in this development, instead of keeping the charging current constant, the current intensity of the charging current is (slightly) reduced in a targeted manner to the same extent that the charging voltage is increased. This can be implemented in such a way that the charging power is kept constant during a charging phase. This drop in the charging current is significantly smaller than at the changeover at the end of the charging phase, however.

In one configuration, during a charging phase, a constant charging current or a charging current with a constant current intensity is injected and then, when the charging voltage applied to the battery cell reaches or exceeds the predefined changeover voltage, there is a changeover to the next charging phase with a lower constant charging current or with a charging current with a lower constant current intensity. This configuration represents an MSCC method in the narrower sense, in which, during the performance thereof, a plurality of successive charging phases with gradually reduced, but in each case constant (apart from the discharge pulses), charging current are set or are present.

The case of a constant charging current and a constant charging power can therefore be considered to be alternative configurations of the overarching concept of the invention. A constant charging current or a constant charging power in this case can be understood to mean that they are set or regulated to an appropriate constant target value during a charging phase. A deviation from the target value during a charging phase is advantageously smaller than 2%, in particular smaller than 1%, in particular smaller than 0.5%.

In the present method, in one development, a transition between successive charging phases occurs immediately, i.e. without a transition phase that is noticeable and set in a targeted manner. In other words, during a charging operation, there is in particular a stepwise reduction of the charging current. The associated charging voltage that is applied to the battery cell and can be easily measured increases continuously following a short drop at the beginning of the charging phase. There is typically a transition from one charging phase to the next charging phase when the charging voltage reaches or exceeds a predefined changeover voltage. The changeover voltage typically corresponds at least approximately to the anode voltage approaching its zero value, typically to a predefined threshold value (also referred to as "critical anode voltage") above the zero value of approximately 10 to 40 mV being reached, as a result of which the advantage of inhomogeneities and model errors of the simulation being compensated for is achieved. The changeover voltage can be different from charging phase to charging phase and generally increases with progressive charging phases. In other words, in order to ascertain the desired changeover time between two charging phases, monitoring is carried out to determine whether the charging voltage applied to the battery cell reaches or exceeds a predefined changeover voltage, and there is a changeover to a next charging phase if this is the case.

An embodiment of the invention is described in more detail below on the basis of a charging current that is constant for a respective charging phase. The invention, however, analogously comprises charging phases with a charging current that is also only at least approximately constant, e.g. with constant charging power with a charging current that drops only slightly during a charging phase.

A "battery cell" is understood in particular to mean a single battery cell. A plurality of battery cells can be combined to form a "battery pack" or a "battery store". The electrical interconnection of the battery cells is fundamentally arbitrary, e.g. in series and/or in parallel. In one development, the voltages present at all of the battery cells of a battery pack, including the charging voltages, can be monitored separately or individually. Alternatively or additionally, the voltage present as a whole at the battery pack can be measured. In addition, the corresponding currents can also be measured, i.e. separately and/or together.

The difference corresponds in particular to the discrepancy between the present charging voltage and the changeover voltage. The fact that additional monitoring is carried out during the charging phases to determine whether the difference reaches or falls below the first threshold value means that, with a similar approach, additional monitoring can also be carried out to determine whether the charging voltage has reached or exceeded a voltage value ("trigger voltage") that corresponds to the first threshold value minus the difference. Both calculation methods and further equivalent definitions can be used interchangeably.

A discharge pulse discharges the battery cell for its whole duration. In the text which follows, without restricting the generality, charging currents are provided with a positive arithmetic sign, whereas discharge currents are provided with a negative arithmetic sign. Upon discharging, the battery voltage is below its equilibrium potential at the present point in time. This voltage difference with respect to the equilibrium potential experiences a change of arithmetic sign upon a change between charging and discharging.

The method is continued until a predefined abort criterion is reached, e.g. the battery cell has reached a sufficient state of charge or a certain total charge time has been reached.

Following the end of a discharge pulse, it is possible for the charging voltage to again fall below the trigger voltage set to trigger this discharge pulse, and subsequently to again reach or exceed the trigger voltage. In this case, a discharge pulse is advantageously not injected onto the same trigger voltage again. In general, in one development, during a charging phase, upon a predefined trigger voltage being reached or exceeded multiple times or a predefined difference being reached or fallen below multiple times, an associated discharge pulse is only triggered once, specifically in particular the first time a predefined trigger voltage or predefined difference is reached or exceeded or fallen below.

In one configuration, a duration of the at least one discharge pulse in each case is in a range between 0.1 s and 10 s, in particular is in a range between 0.5 s and 2 s, in particular is approximately 1 s.

In one configuration, a discharge pulse has an amplitude absolute value that does not fall below a value C/10, in particular does not fall below a value C/3, in particular does not fall below a value C/2, of the C rate of the battery cell. The C rate or C factor is a known battery-specific variable that is not discussed any further here. If it is C $[h^{-1}]$, the discharge pulse is therefore advantageously set such that it has a current intensity of the discharge current $I_{SE}$ of at least $-C/10$ amperes or an amplitude absolute value $|I_{SE}|$ of C/10 amperes. It is therefore advantageously the case that $|I_{SE}| \leq -C/10$ or $|I_{SE}| > C/10$ is set. Setting the intensity of the discharge current $I_{SE}$ of the discharge pulse based on the (unitless) value of the C rate of the battery cell in a predefined relationship guarantees a selection of the discharge pulse that is advantageous independently of a capacity of the cell.

In one development, the amplitude absolute value of the discharge pulse does not exceed a value of 1 C. Restricting the C rate to values of no more than 1 C first has the advantage of limiting the complexity in terms of circuitry, and secondly, at very high C rates and a consistent amount of charge, the pulse would only be correspondingly short, with the result that the removal of any deposited or plated lithium or other homogenization processes in the electrodes would not be able to take place, or would not be able to take place for long enough. It is however in principle also possible for the amplitude absolute value of the discharge pulse values to be selected to be greater than 1 C, for example 2 C, 5 C, 10 C, etc.

In general, in one configuration, charge discharged in the event of a discharge pulse ("discharge pulse charge") is increased as the health of the battery cell decreases. The advantage of also taking into consideration the fact that the plating tendency in aged battery cells can be higher than in healthy battery cells is therefore achieved. The increasing discharge pulse charge serves as a counter-reaction to the decreasing health. The health can be quantified by way of what is known as the SoH (state of health) characteristic value, providing information about the percentage of an initial cell capacity that can still be used in the present charging cycles. A healthy battery cell corresponds to an SoH of 1 or 100%. The configuration can therefore be expressed in such a way that charge discharged in the event of a discharge pulse ("discharge pulse charge") is increased as the SoH value of the battery cell decreases. In a particularly advantageous development, the amplitude absolute value of a discharge pulse increases inversely proportionally to the SoH characteristic value.

In one configuration, a discharge pulse of a healthy battery cell has an amplitude absolute value that does not exceed the value C, in particular corresponds to the value C, of the C rate of the battery cell, and the amplitude absolute value is increased as the health decreases.

In an alternative development, the C rate of the discharge pulse is kept constant as the SoH characteristic value decreases, which in the case of a decreasing SoH value corresponds to a decrease in the current amplitude. As a further possibility, however, the C rate of the discharge pulse can be kept constant. Moreover, the discharge pulse duration can alternatively or additionally be increased as the SoH value decreases.

In one configuration, an amount of discharge (e.g. given in coulombs) that is output to the battery cell by the at least one discharge pulse during a certain charging phase, when summed, does not exceed 5% of the amount of charge of this charging phase, in particular does not exceed 4% of the amount of charge, in particular does not exceed 3% of the amount of charge, in particular does not exceed 2% of the amount of charge, in particular does not exceed 1% of the amount of charge. This is because it has been found that, even with such a low amount of discharge, plating can be better prevented and increasing of the charging time can be kept to a minimum.

In one development, the amount of discharge is at least 0.1%, in particular at least 0.2%, in particular at least 0.5% of the amount of charge of the charging phase. Plating is effectively prevented as a result.

It is particularly advantageous if the amount of discharge is between 0.1% and 1% of the amount of charge.

In one configuration, during a charging phase, a plurality of discharge pulses are applied to the battery cell in a temporally spaced-apart manner when the predefined difference or an associated trigger voltage is reached. This results in the advantage that the effect of the discharge pulses that suppresses or reverses the plating is spread over a relatively long period of time, which makes the anti-plating effect particularly effective.

In one development, the discharge pulses are applied or injected in a firmly predefined chronological order.

In one configuration, following a first discharge pulse, a further or additional discharge pulse is always applied if the charging voltage has increased by a predefined value ("additional voltage value") after having reached the difference. The discharge pulses are therefore applied at points in time that are particularly favorable for preventing plating. By way of example, the changeover voltage can be $U_U$ for a certain charging phase and the trigger voltage $U_{SE}$ for applying the first discharge pulse can have a difference of $\Delta U$ from the changeover voltage $U_U$, that is to say that $U_{SE}=U_U-\Delta U$, wherein the voltages $U_{SE}$, $U_U$, $\Delta U$ have positive arithmetic signs, meaning that $U_{SE}<U_U$. The first discharge pulse P0 is therefore triggered if, for the voltage (charging voltage) applied to the battery cell, $U_L=U_{SE}$, and every nth further discharge pulse Pn of this charging phase is triggered if, for the charging voltage, $U_L=U_{SE}+n\cdot U_Z$, with $U_Z>0$ being a predefined additional voltage value. For $U_Z$, it is in particular the case that $U_Z \leq \Delta U/2$. The natural positive number n therefore indicates the number of further or additional discharge pulses P1 to P9 following the first discharge pulse P0 of this charging phase.

In one development, the additional voltage value $U_Z$ has the same value for all the discharge pulses. Alternatively, the additional voltage value $U_Z$ can be different for at least two discharge pulses.

In one configuration, the difference or the value or magnitude thereof corresponds at least approximately to a critical threshold value of an anode voltage of the battery cell. The risk of plating noticeably increases when the critical threshold value is reached or fallen below. This "critical anode voltage" can be estimated or determined experimentally or by way of simulations, for example. The critical anode voltage can assume, for example, a value between approximately 10 mV and 40 mV.

In one configuration, the magnitude of the difference is constant for all the charging phases.

In one alternative configuration, the magnitude of the difference is different for at least two charging phases. The magnitude of the difference can therefore become larger or smaller in following charging phases.

In general, the at least one discharge pulse does not need to be injected onto all of the charging phases, but rather only onto the initial n charging phases of a group of m>n charging phases. This is advantageous if the risk of plating is practically eliminated for charging phases>n.

In one development, the magnitude of the difference is changed for a respective charging phase, for example depending on an SoH (state of health) characteristic value of the battery cell. In particular, the difference can be increased as the SoH characteristic value decreases. The advantage is therefore also achieved that a state of health of the battery cell is taken into consideration for preventing plating.

In one configuration, a lithium-based battery cell is charged, for example a lithium-ion battery cell, a lithium-polymer battery cell or a lithium-containing solid-state battery cell, or the battery cell is a lithium-based battery cell.

In one configuration, a plurality of battery cells are combined to form a battery pack or battery store. The method can then be carried out analogously. This can be implemented particularly easily if the charging voltages of the individual battery cells of the battery pack can be individually measured and can be individually set.

In one configuration, monitoring is performed individually for each battery cell of the battery pack to determine whether the difference has been reached or fallen below, and at least one discharge pulse is applied to the battery pack as soon as even only one battery cell reaches or falls below the difference. This method provides the advantage that plating can also be prevented in a particularly reliable manner if the charging voltages of the individual battery cells of the battery pack can be individually measured, but the charging voltage is applied to the battery pack as a whole. In particular, the procedure can be as follows in this configuration: The battery pack is charged, and the first charging phase is initially executed in the process. One of the battery cells, as the first, then reaches the trigger voltage $U_{SE}$. The discharge pulse is then applied to the whole battery pack. The battery pack is subsequently charged further (the trigger voltage $U_{SE}$ can be passed through again in the process, but there is no new discharge pulse executed for this trigger voltage $U_{SE}$, since it has already been triggered once) and a battery cell—presumably the same battery cell that, as the first, had already reached the trigger voltage $U_{SE}$—will reach the changeover voltage $U_U$ and therefore force the change to the next charging phase with the accompanying abrupt reduction in the charging current.

In a battery pack of particularly simple design, in which the individual battery cells are linked to one another in series and the charging voltages of the individual battery cells cannot be individually measured, the method can for example be carried out in an analogous manner in that, in the case of m battery cells, for the charging voltage $U_L$ of the battery cells, $U_L = U_{L,pack}/m$, where $U_L = U_{L,pack}$ is the charging voltage applied to the battery pack.

The object is also achieved by a battery charging apparatus, wherein the battery charging apparatus is designed to carry out the method as described above. The battery charging apparatus can be designed analogously to the method and has the same advantages. By way of example, the battery charging apparatus can have a supply connection for providing electrical energy, a measurement apparatus for measuring the voltage applied to a battery cell or a battery pack, and optionally a current measurement apparatus for measuring the current flowing to and/or from the battery cell or the battery pack and a control device for controlling the method.

The object is also achieved by a vehicle, having at least part of the battery charging apparatus. The battery charging apparatus can be designed analogously to the battery charging apparatus and/or the method and has the same advantages. In one development, the vehicle is a vehicle driven by electric battery. The vehicle can be, for example, a motor vehicle (e.g. an automobile such as a car, truck, bus, etc. or a motorcycle), a train, a watercraft (e.g. a boat or a ship) or an aircraft (e.g. an airplane or a helicopter).

The object is furthermore achieved by a charging station for a vehicle, having at least part of the battery charging apparatus.

The battery charging apparatus can therefore be implemented in a vehicle, a charging station or distributed between a vehicle and an appropriate charging station.

The above-described properties, features and advantages of this invention and the manner in which they are achieved become clearer and more distinctly comprehensible in connection with the following schematic description of an exemplary embodiment, which is explained in more detail in connection with the drawings.

DETAILED DESCRIPTION OF THE DRAWINGS

Figure 1:
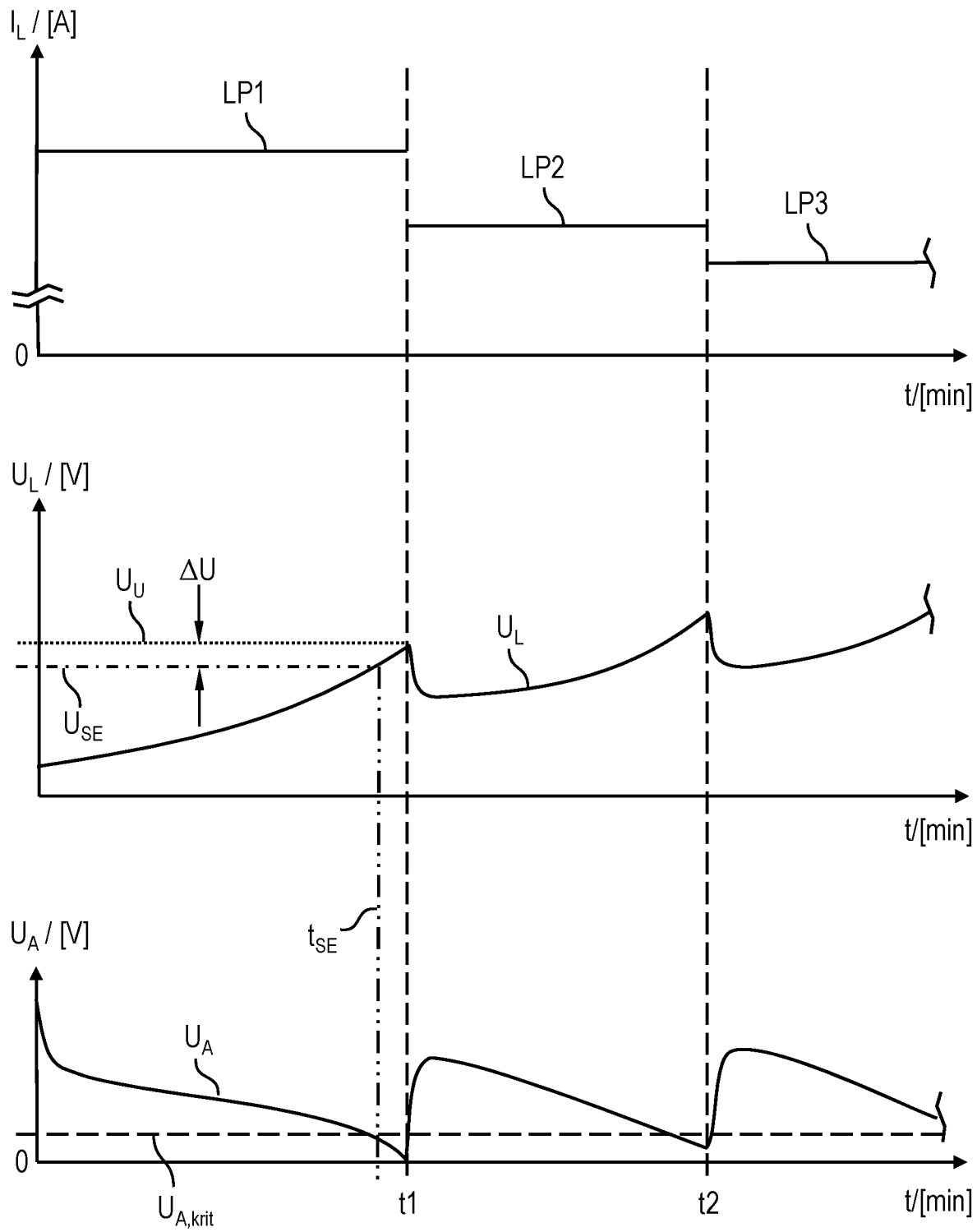
FIG. 1 shows, in the form of a sketch and not to scale, three plots of charging parameters, which describe an MSCC charging operation, against time in minutes, as yet without discharge pulses.

FIG. 1 shows plots of typical charging parameters of an MSCC charging operation against time t in minutes for a lithium-ion battery cell as yet without discharge pulses, specifically the charging current $I_L$ in amperes for a plurality of charging phases LP1, LP2 and LP3 in an upper plot, the charging voltage $U_L$, applied to the same battery cell, in volts, in a middle plot, and the associated anode voltage $U_A$ in volts in a lower plot.

With respect to the upper plot, the charging phases LP1, LP2, LP3 have a charging current $I_L$ that in each case is constant but gradually decreasing for successive charging phases LP1, LP2, LP3, for example $I_L$=125 A during LP1, $I_L$=90 A during LP2 and $I_L$=75 A during LP3, etc. The changeover time between LP1 and LP2 is referred to as t1 and the changeover time between LP2 and LP3 is referred to as t2. At the changeover times t1 and t2, the associated charging current $I_L$ is decreased in a stepped manner.

The middle plot shows that the charging voltage $U_L$, which is needed for maintaining a constant charging current $I_L$, typically increases continuously for a respective charging phase LP1 to LP3 after initially decreasing for a short time following a changeover between two charging phases LP1, LP2 or LP2, LP3. The changeover is triggered or carried out when the charging voltage $U_L$ of a charging phase LP1 to LP3 reaches a respective changeover voltage $U_U$. The changeover voltages $U_U$ can in particular be selected in such a way that they are greater for each following charging phase LP1, LP2, LP3. This is generally expedient, since the charging voltage $U_L$ of a following charging phase LP2, LP3 exceeds the changeover voltage $U_U$ of the preceding charging phase LP1 or LP2 comparatively quickly. By way of example, it may be the case that $U_U$(LP1)=3.95 V, $U_U$(LP2)=4.00 V and $U_U$(LP3)=4.05 V.

The lower plot shows that the anode voltage $U_A$ measured overall against Li/Li$^+$, for example, decreases during each of the charging phases LP1 to LP3. If the anode voltage $U_A$ were to become negative in the course of the charging phase LP1, LP2, LP3, plating would occur. The overall anode voltage $U_A$ is therefore kept as a positive value during the charging operation. However, on account of inhomogeneities, shape, etc. of the anode, a local deviation from the overall measured anode voltage $U_A$ can arise, wherein a negative anode voltage can occur locally even if the overall measured anode voltage $U_A$ is still positive. For the present method, it is therefore assumed that the risk of local plating noticeably increases even when a positive critical anode voltage $U_{A,krit}$ is reached or fallen below.

This critical anode voltage $U_{A,krit}$ is reached at a time $t_{SE}$, and a trigger voltage $U_{SE}$ for triggering or initiating at least the first discharge pulse P0, in particular the discharge pulses P0 to P9 (see FIG. 3), is advantageously set in such a way that the charging voltage $U_L$ likewise reaches this trigger voltage $U_{SE}$ at least approximately at the time $t_{SE}$. In other words, the trigger voltage $U_{SE}$ is selected such that it coincides with the critical anode voltage $U_{A,krit}$ being reached. This means that discharge pulses P0 to P9 preventing plating are injected or applied only when it is necessary, specifically if the anode voltage $U_A$ enters the voltage range $U_A \leq U_{A,krit}$ that is critical for the plating. The application of discharge pulses P0 to P9 that increase the charging time of the battery cell to time or voltage ranges $t < t_{SE}$ or $U_A > U_{A,krit}$ that are uncritical for the plating is therefore avoided in a targeted manner. Thought is also given to the fact that, to achieve a short charging time, the changeover of a charging phase LP1 to LP3 is advantageously delayed for as long as possible, which also means that the anode voltage $U_A$ should be brought as close as possible to $U_A$=0. This objective can be largely achieved, without producing plating, through the use of the discharge pulses P0 to P9, also taking inhomogeneities, shape, etc. of the anode into consideration.

Figure 2:
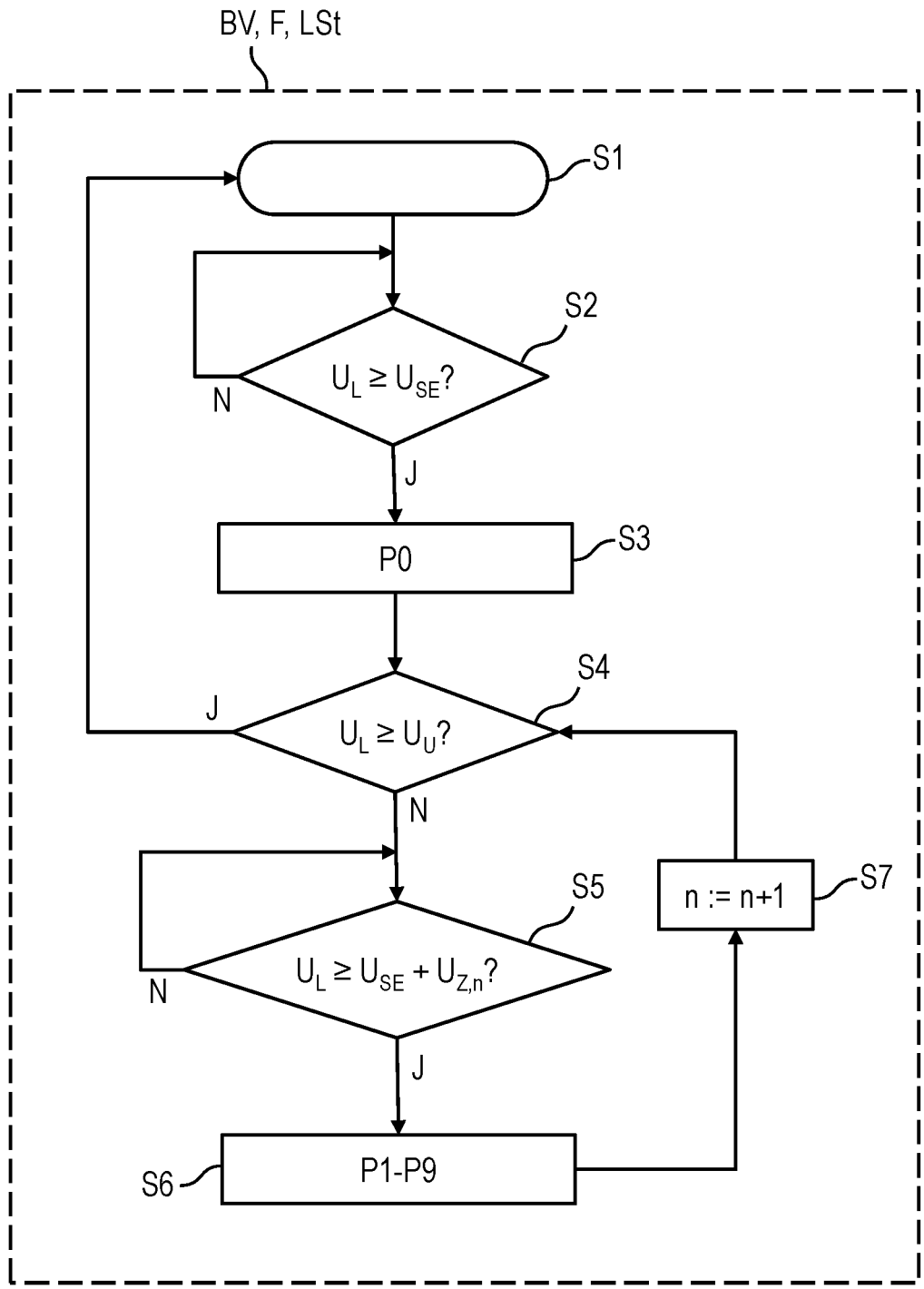
FIG. 2 shows a possible flowchart for carrying out the method.
Figure 3:
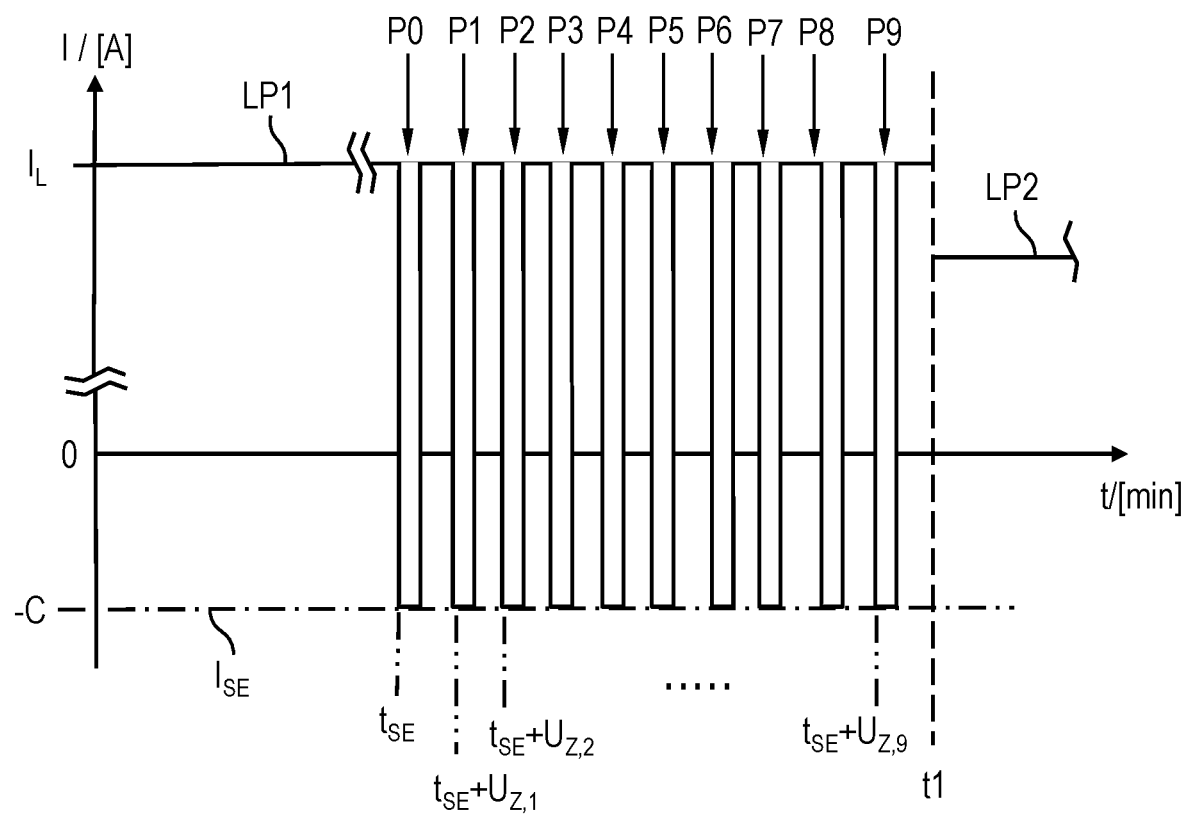
FIG. 3 shows, in the form of a sketch and not to scale, a plot of a current, flowing to and from a battery cell, during a charging phase following the associated trigger voltage being reached, with discharge pulses.

FIG. 2 shows a possible flowchart for carrying out the method be implemented in a battery charging apparatus BV. The battery charging apparatus BV can constitute a part or component of a vehicle F and/or a charging station LSt. FIG. 3 shows a corresponding plot of the current I, flowing to and from the battery cell, against time t for the first charging phase LP1.

In a step S1, a charging phase LP1 is started at the beginning of a charging operation, for example.

Then, monitoring is carried out in step S2 to determine whether the difference ΔU between the changeover voltage $U_U$ and the applied charging voltage $U_L$ is reached or fallen below, or whether the charging voltage $U_L$ has reached or exceeded the trigger voltage $U_{SE}=U_U-\Delta U$.

If this is the case ("Y"), in a step S3, a first discharge pulse P0 of, for example, a duration between 0.1 s and 10 s is injected, as also shown in FIG. 3.

Following the end of the first discharge pulse P0, monitoring is carried out in step S4 to determine whether the charging voltage $U_L$ has reached the changeover voltage $U_U$. If this is the case ("Y"), there is a changeover to a following charging phase LP1, LP2, LP3 or a new charging phase LP1, LP2, LP3 is begun.

If this is not the case ("N"), monitoring is carried out in step S5 to determine whether the charging voltage $U_L$ has reached the trigger voltage $U_{SE}$ plus an nth additional voltage value $U_{Z,n}$, wherein n is the number of the additional (second, etc.) discharge pulses P1 to P9. Monitoring is therefore carried out to determine whether $U_L \geq U_{SE}+U_{Z,n}$. If the discharge pulses P1 to P9 are intended to be triggered equidistantly with respect to the voltage, the trigger condition can also be described as $U_L \geq U_{SE}+n \cdot U_Z$, wherein n=1 for the first additional discharge pulse.

If this is the case ("Y"), a further nth discharge pulse P1 to P9 is applied in step S6 and, following the end of this, in step S7 there is a branch back to step S4, with n being incremented (n≈n+1). In the present case, nine further discharge pulses P1 to P9 are applied, for example.

This sequence is carried out until the charging operation is interrupted or ended.

As shown in FIG. 3, the discharge pulses P1 to P9 can have the same pulse duration, e.g. of 1 s, and/or can have the same discharge current amplitude, e.g. corresponding to a value of the C rate of the battery cell. If the inherent C rate of a battery cell is C h$^{-1}$, a discharge current $I_{SE}$ is advantageously set to $I_{SE} \leq -C/10$, in this case particularly advantageously to $I_{SE}=-C$ amperes. By way of example, the discharge current can be $I_{SE}=-60$ A. In particular, the amount of charge that is discharged by injecting the discharge pulses P0 to P9 collectively during the associated charging phase LP1 is at least 0.1% of the amount of charge of the associated charging phase LP1 and/or does not exceed 2% of the amount of charge.

For example, it may be the case that ΔU=10 mV, while, for example, it may be the case that $U_Z$=1 mV.

By virtue of the extension that, instead of the charging voltage $U_L$ of an individual battery cell, the maximum of the charging voltages $U_L$ of all the present battery cells of a battery pack is initially formed, the method is also directly to a battery pack with a plurality of battery cells.

It goes without saying that the present invention is not restricted to the exemplary embodiment shown.

Step S4 can therefore also be executed at another point, for example if the values of ΔU and $U_Z$ or $U_{Z,n}$ are already known, and it is therefore also known how many discharge pulses P1 to P9 can be generated. In this case, step S5 can be executed immediately after step S3 and from step S6 there can be a branch back to step S5 via step S7 until the last discharge pulse P9 has been applied. Analogously to step S4, a check is subsequently carried out to determine whether the charging voltage $U_L$ has reached the changeover voltage $U_U$. In particular, a check can then be carried out in step S7 to determine whether the known last value for n ("nfinal", in the present exemplary embodiment, for example, nfinal=9) has been reached and there can then be a branch to step S4.

In general, "a(n)", "one", etc. can be understood as a singular or a plural, particularly in the sense of "at least one" or "one or more", etc., as long as this is not explicitly excluded, e.g. by the expression "exactly one", etc.

A numerical value can also comprise precisely the specified number and a customary tolerance range, as long as this is not explicitly ruled out.

LIST OF REFERENCE SIGNS

BV Battery charging apparatus
C Value of the C factor
F Vehicle
$I_{SE}$ Discharge current
$I_L$ Charging current
LP1-LP3 Charging phase
LSt Charging station
n Index of a further discharge pulse
P0 First discharge pulse
P1-P9 Further discharge pulse
S1-S7 Method steps
$U_A$ Anode voltage
$U_{A,krit}$ Critical anode voltage
$U_L$ Charging voltage
$U_{SE}$ Trigger voltage
$U_U$ Changeover voltage
$U_Z$ Additional voltage value
$U_{Z,n}$ Additional voltage value of the nth further discharge pulse
$t_{SE}$ Trigger time
t1 Changeover time
t2 Changeover time
ΔU Difference

What is claimed is:

1. A method for charging a battery cell in charging phases, the method comprising:

during a charging phase with a charging current that is at least approximately constant, performing monitoring to determine whether a charging voltage applied to the battery cell reaches or exceeds a predefined changeover voltage and, if the charging voltage applied to the battery cell reaches or exceeds the predefined changeover voltage, performing a changeover to a next charging phase with a lower charging current that is at least approximately constant, and during each charging phase of the charging phases, performing additional monitoring to determine whether a predefined difference between the charging voltage and a respective changeover voltage of the charging phase is reached or fallen below, and, if the predefined difference between the charging voltage and the respective changeover voltage of the charging phase is reached or fallen below, applying at least one discharge pulse to the battery cell, wherein during a charging phase of the charging phases, after the at least one discharge pulse has been applied, if the predefined difference between the charging voltage and the respective changeover voltage is reached again, another discharge pulse is not applied, and if the charging voltage has increased by a predefined additional-voltage value after the predefined difference has been reached, another discharge pulse is applied.

2. The method according to claim 1, wherein a duration of the at least one discharge pulse is in a range between 0.1 s and 10 s.

3. The method according to claim 2, wherein the range is between 0.5 s and 2 s.

4. The method according to claim 1, wherein the at least one discharge pulse has an amplitude absolute value that does not fall below a value C/10 of a C rate of the battery cell.

5. The method according to claim 1, wherein an amount of discharge that is output to the battery cell by the at least one discharge pulse during the charging phase, when summed, does not exceed 5% of the amount of charge of the charging phase.

6. The method according to claim 5, wherein the amount of discharge that is output to the battery cell by the at least one discharge pulse during the charging phase, when summed, does not exceed 1% of the amount of charge of the charging phase.

7. The method according to claim 6, wherein the amount of discharge that is output to the battery cell but the at least one discharge pulse during the charging phase, when summed, is between 0.1% and 1% of the amount of charge of the charging phase.

8. The method according to claim 1, wherein during the charging phase of the charging phases, a plurality of discharge pulses are applied to the battery cell in a temporally spaced-apart manner when the difference is reached or fallen below.

9. The method according to claim 1, wherein the difference corresponds to a critical threshold value of an anode voltage of the battery cell.

10. The method according to claim 1, in which the difference is constant for all of the charging phases.

11. The method according to claim 1, wherein the difference is different for at least two of the charging phases.

12. The method according to claim 1, wherein a lithium-based battery cell is charged.

13. The method according to claim 12, wherein the lithium-based battery cell is a lithium battery cell.

14. The method according to claim 1, in which a plurality of battery cells are combined to form a battery pack.

15. The method according to claim 14, wherein the monitoring is performed individually for each battery cell of the battery pack to determine whether the difference has been reached or fallen below, and at least one discharge pulse is applied to the battery pack as soon as one battery cell reaches or falls below the difference.

16. A battery charging apparatus that is configured to perform the method according to claim 1.

17. A vehicle comprising at least part of the battery charging apparatus according to claim 16.

18. A charging station for a vehicle, the charging station comprising at least part of the battery charging apparatus according to claim 16.

* * * * *